US012695016B2

(12) United States Patent
Kuriyama et al.

(10) Patent No.: US 12,695,016 B2
(45) Date of Patent: Jul. 28, 2026

(54) MULTILAYER MAGNETIC SHEET

(71) Applicant: Proterial, Ltd., Tokyo (JP)

(72) Inventors: Yasuo Kuriyama, Tokyo (JP); Kouhei Miyano, Tokyo (JP); Yuichi Ogawa, Tokyo (JP)

(73) Assignee: Proterial, Ltd., Tokyo (JP)

( * ) Notice: Subject to any disclaimer, the term of this patent is extended or adjusted under 35 U.S.C. 154(b) by 602 days.

(21) Appl. No.: 18/297,071

(22) Filed: Apr. 7, 2023

(65) Prior Publication Data

US 2023/0326644 A1 Oct. 12, 2023

(30) Foreign Application Priority Data

Apr. 8, 2022 (JP) ................................ 2022-064701

(51) Int. Cl.

*H01F 10/13* (2006.01)
*H01F 10/26* (2006.01)
*H01F 10/28* (2006.01)
*H01F 10/30* (2006.01)

(52) U.S. Cl.

CPC ......... *H01F 10/138* (2013.01); *H01F 10/265* (2013.01); *H01F 10/28* (2013.01); *H01F 10/30* (2013.01)

(58) Field of Classification Search

CPC ...... B32B 7/00–7/14; B32B 3/00–3/30; B32B 15/00–15/20

See application file for complete search history.

(56) References Cited

U.S. PATENT DOCUMENTS

2007/0040643 A1 2/2007 Inoue et al.
2015/0123604 A1 5/2015 Lee et al.
2019/0027302 A1 1/2019 Noh et al.
2019/0296432 A1 9/2019 Lim et al.
2022/0293313 A1 9/2022 Kuriyama
2022/0298593 A1 9/2022 Kuriyama

FOREIGN PATENT DOCUMENTS

CN 209087527 U 7/2019
JP H0410698 A 1/1992
JP H06140783 A 5/1994

(Continued)

OTHER PUBLICATIONS

Extended European Search Report issued in EP application No. 23159405.2-1212; dated Aug. 25, 2023; 13 pages.

(Continued)

*Primary Examiner* — Prashant J Khatri

(74) *Attorney, Agent, or Firm* — Meunier Carlin & Curfman LLC

(57) ABSTRACT

A multilayer magnetic sheet comprises ten or more layers of magnetic strips each formed in a band shape with a short side and a long side. The magnetic strips are aligned and arranged in a plate shape in each of the layers such that the long sides of the magnetic strips are adjacent to each other. The layers comprise first layers, in which the long sides of the adjacent magnetic strips overlap, and second layers, in which the long sides of the adjacent magnetic strips do not overlap. The first layers comprise at least two stacked layers. A position of the long side in one layer included in the second layers is separated from a position of the long side in another layer included in the second layers by 0.5 mm or more in a direction in which the short side extends.

14 Claims, 12 Drawing Sheets

(56) References Cited

FOREIGN PATENT DOCUMENTS

| | | | |
|---|---|---|---|
| JP | H06140785 | A | 5/1994 |
| JP | 2008112830 | A | 5/2008 |
| JP | 2008529266 | A | 7/2008 |

OTHER PUBLICATIONS

Non-Final Office Action mailed Oct. 5, 2023, in U.S. Appl. No. 18/295,561; 9 pages.
Non-Final Office Action mailed May 12, 2025, in U.S. Appl. No. 18/118,812; 9 pages.
Office Action issued in Japanese Patent Application No. 2022-064699, dated Oct. 21, 2025, machine English translation provided, 10 pages.
Office Action issued in Japanese Patent Application No. 2022-064700, dated Oct. 20, 2025, machine English translation provided, 11 pages.
Office Action issued in Japanese Patent Application No. 2022-064701, dated Oct. 21, 2025, machine English translation provided, 15 pages.

MULTILAYER MAGNETIC SHEET

CROSS-REFERENCE TO RELATED APPLICATIONS

The present application claims priority based on Japanese Patent Application No. 2022-064701 filed to the Japanese Patent Office on Apr. 8, 2022, and the content of Japanese Patent Application No. 2022-064701 is incorporated herein by reference in its entirety.

BACKGROUND

The present disclosure relates to a multilayer magnetic sheet that can be used in, for example, a contactless charging device for charging a secondary battery of an automobile.

In recent years, attention has been focused on contactless charging in which a transmission coil is provided on each of a power supply side and a power reception side and charging is performed by power transmission using electromagnetic induction. In the contactless charging, a magnetic flux generated in a primary transmission coil of a power feeding device generates an electromotive force in a secondary transmission coil of a power receiving device through casings of the power feeding device and the power receiving device, whereby a power is supplied.

The contactless charging has been spreading to electronic devices such as a tablet-type information terminal, a music player, a smartphone, and a mobile phone. The contactless charging is a technology applicable to electronic devices in addition to those devices described above, electric vehicles, and drones. The contactless charging is also a technology applicable to a transport vehicle such as a forklift and an automated guided vehicle (AGV), a railway, a tram, and the like.

In order to increase a power transmission efficiency in the contactless charging, a magnetic sheet may be installed as a coil yoke on a side of the transmission coil opposite to contact surfaces of the power feeding device and the power receiving device. The magnetic sheet disposed in this manner has a role as a magnetic shielding material for preventing leakage of the magnetic flux during the charging, a role as a yoke member for refluxing the magnetic flux generated in the coil during the charging, and the like.

As a method for manufacturing the magnetic sheet described above, various methods have been proposed (e.g., see Japanese Unexamined Patent Application Publication No. 2008-112830 (Patent Document 1), Japanese Unexamined Patent Application Publication (Translation of PCT Application) No. 2015-505166 (Patent Document 2), and WO 2020/235642 (Patent Document 3)). Each of Patent Documents 1 to 3 discloses a manufacturing method including a step of dividing a thin sheet-shaped magnetic body included in a magnetic sheet, a ribbon of an amorphous alloy or a nanocrystalline grain alloy, or the like (hereinafter referred to also as an "alloy strip") into a plurality of pieces for the purpose of improving a quality (Q) factor or reducing an eddy current loss.

In the case of contactless charging used in an electric vehicle or the like, in comparison with an electronic device such as a smartphone, it is difficult to dispose a primary coil and a secondary coil close to each other. For example, the primary coil and the secondary coil need to be electromagnetically coupled in a state where an interval therebetween is wide in comparison.

Also, a power transmitted between the primary coil and the secondary coil needs to be made large in comparison.

Specifically, a current allowed to flow through the primary coil also becomes large in comparison, and the magnetic flux between the primary coil and the secondary coil also needs to be made large.

Thus, the primary coil and the secondary coil become large in comparison, and there has been a problem in that a magnetic sheet used for an electronic device such as a smartphone is insufficient in size. Further, with the magnetic flux becoming large in comparison, there has been a problem in that the magnetic flux tends to leak to other devices.

The alloy strip included in the magnetic sheet has a shape extending in a band shape. There has been a problem in that the width of the alloy strip, which is a dimension in a direction orthogonal to the longitudinal direction, is narrow for contactless charging used in electric vehicles and the like.

In this regard, there is also known a technique of arranging a plurality of alloy strips in a plate shape and further stacking the plurality of alloy strips arranged in the plate shape in a thickness direction (e.g., see Japanese Unexamined Patent Application Publication (Translation of PCT Application) No. 2019-522355 (Patent Document 4)). In the technique described in Patent Document 4, it is easy to increase the width of the surface on which the alloy strips are disposed.

SUMMARY

The technique described in Patent Document 4 is a method of stacking single-layer alloy strips. Patent Document 4 discloses a form in which ribbon sheets of a plurality of nanocrystalline grain alloys are arranged in an m×n matrix structure and discloses that the ribbon sheets can have widths different from each other.

The inventors of the present invention have realized that a magnetic sheet for contactless charging used for, for example, an electric vehicle or the like needs to be formed with more layers of strips than a magnetic sheet for an electronic device such as a mobile phone and needs to be formed with the strips aligned in a lateral direction as well. The inventors found in studying the configuration of the multilayer magnetic sheet that a position of a magnetic gap formed between the magnetic strips when the magnetic strips are aligned and arranged in the lateral direction affects the characteristics.

The present disclosure provides a multilayer magnetic sheet with favorable magnetic characteristics, in which magnetic strips are aligned in a lateral direction and stacked in multiple layers.

A multilayer magnetic sheet according to an aspect of the present disclosure comprises ten or more layers of magnetic strips each formed in a band shape with a short side and a long side. The magnetic strips are aligned and arranged in a plate shape in each of the layers such that the long sides of the magnetic strips are adjacent to each other. The layers comprise first layers, in each of which the long sides of the magnetic strips adjacent to each other overlap, and second layers, in each of which the long sides of the magnetic strips adjacent to each other do not overlap. The first layers comprise at least two stacked layers. A position of the long side in one layer included in the second layers is separated from a position of the long side in another layer included in the second layers by 0.5 mm or more in a direction in which the short side extends.

Further, in the multilayer magnetic sheet according to an aspect of the present disclosure, a position of the long side in still another layer included in the second layers is separated from the positions of the long sides in the one layer and the other layer included in the second layers by 0.5 mm or more in the direction in which the short side extends.

With the multilayer magnetic sheet of the present disclosure, overlapping of the positions of the magnetic gaps when viewed in a stacking direction of the magnetic strips can be prevented, so deterioration of magnetic characteristics in the multilayer magnetic sheet can be prevented, and it is easy to obtain a multilayer magnetic sheet with a high magnetic permeability and a high Q factor.

With the multilayer magnetic sheet of the present disclosure, it is possible to prevent the overlapping of the positions of the magnetic gaps when viewed in the stacking direction of the magnetic strips, and it is possible to obtain a multilayer magnetic sheet with favorable magnetic characteristics.

BRIEF DESCRIPTION OF THE DRAWINGS

An example embodiment of the present disclosure will be described below with reference to the accompanying drawings, in which.

DETAILED DESCRIPTION OF EXEMPLARY EMBODIMENTS

A multilayer magnetic sheet 400 according to one embodiment of the present disclosure will be described with reference to FIGS. 1 to 12. The multilayer magnetic sheet 400 according to one embodiment is used for a contactless-type charging device. The multilayer magnetic sheet 400 may be used in a power feeding device of a charging device or may be used in a power receiving device.

In the present embodiment, a description will be given by applying the present disclosure to an example in which the multilayer magnetic sheet 400 is used for contactless charging of a device that consumes more power than an information processing device such as a smartphone or an electronic device. For example, a description will be given by applying the present disclosure to an example in which the multilayer magnetic sheet 400 is used for contactless charging of a moving body such as an automobile. Note that the multilayer magnetic sheet 400 may be used for contactless charging of an information processing device, an electronic device, or the like. The multilayer magnetic sheet 400 is also applicable to a transport vehicle such as a forklift and an AGV, a railway, a tram, and the like.

Figure 1:
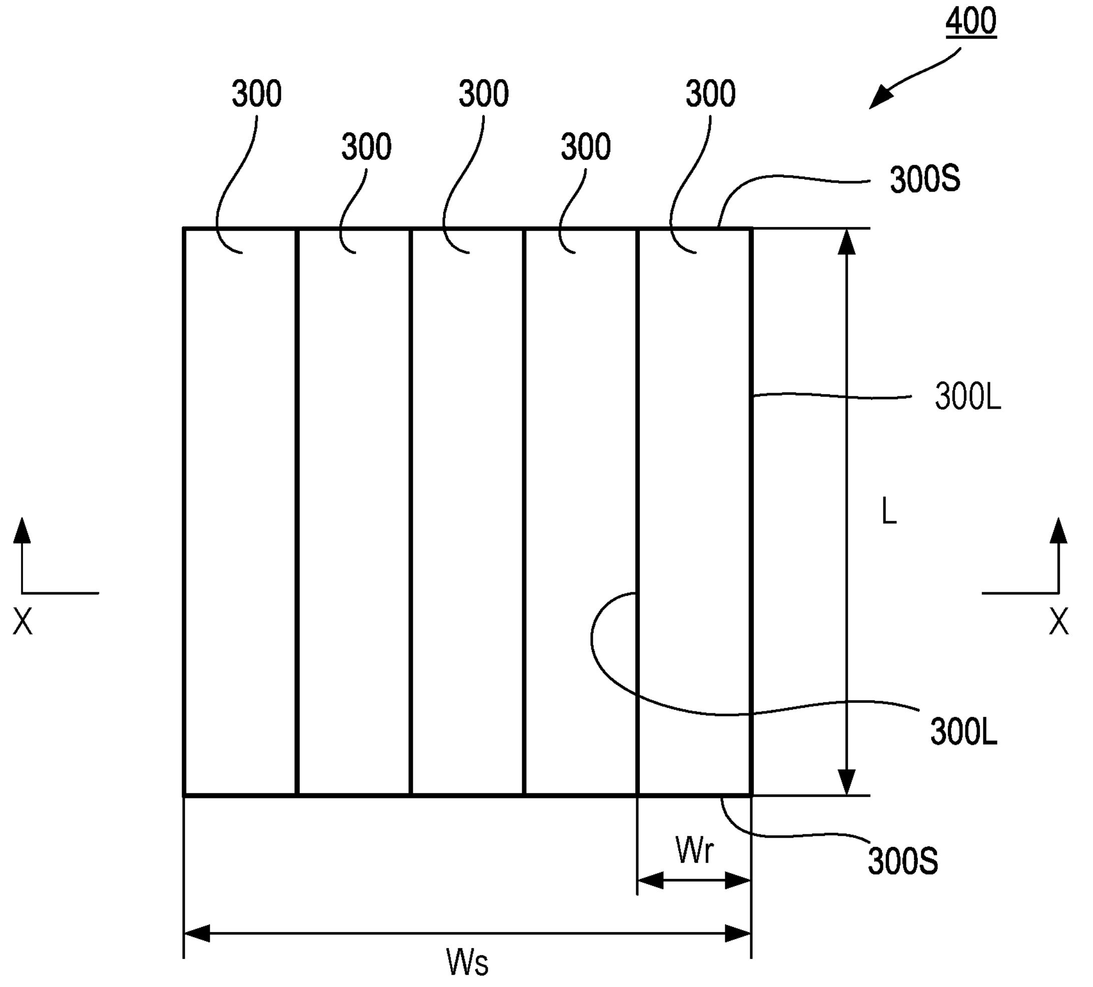
FIG. 1 is a plan view for explaining a structure of a multilayer magnetic sheet according to the present disclosure.
Figure 2:
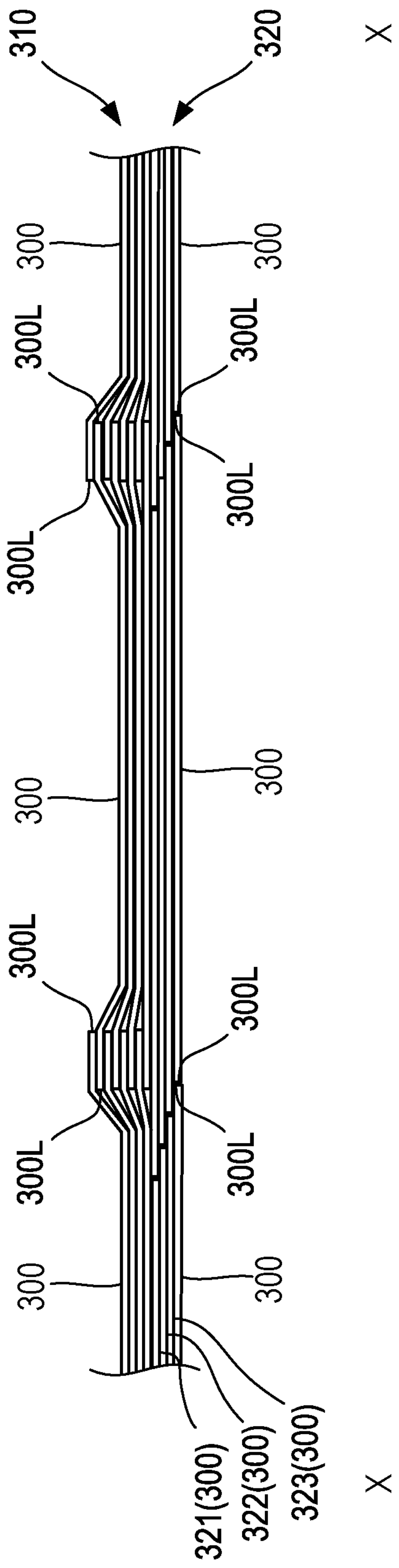
FIG. 2 is a partial cross-sectional view for explaining a structure of the multilayer magnetic sheet.

FIG. 1 is a plan view for explaining a structure of the multilayer magnetic sheet 400. FIG. 2 is a partial cross-sectional view for explaining the structure of the multilayer magnetic sheet 400.

In the multilayer magnetic sheet 400, layers, in each of which a plurality of magnetic strips 300 formed in a band shape are aligned and arranged in a plate shape as illustrated in FIG. 1, are aligned in the form of a multilayer.

As illustrated in the partial cross-sectional view of FIG. 2, the plurality of magnetic strips 300 are aligned and arranged in a plate shape such that long sides 300L are adjacent to each other.

Upper four layers in FIG. 2 are arranged such that the long sides 300L of the adjacent magnetic strips 300 overlap each other. These layers are also referred to as "first layers 310".

Lower four layers in FIG. 2 are arranged such that the long sides 300L of the adjacent magnetic strips 300 do not overlap each other. These layers are also referred to as "second layers 320". In the second layers, an interval between the magnetic strips 300 aligned and arranged in the direction in which a short side 300S extends is preferably 0 mm or more and 5 mm or less.

Figure 3:
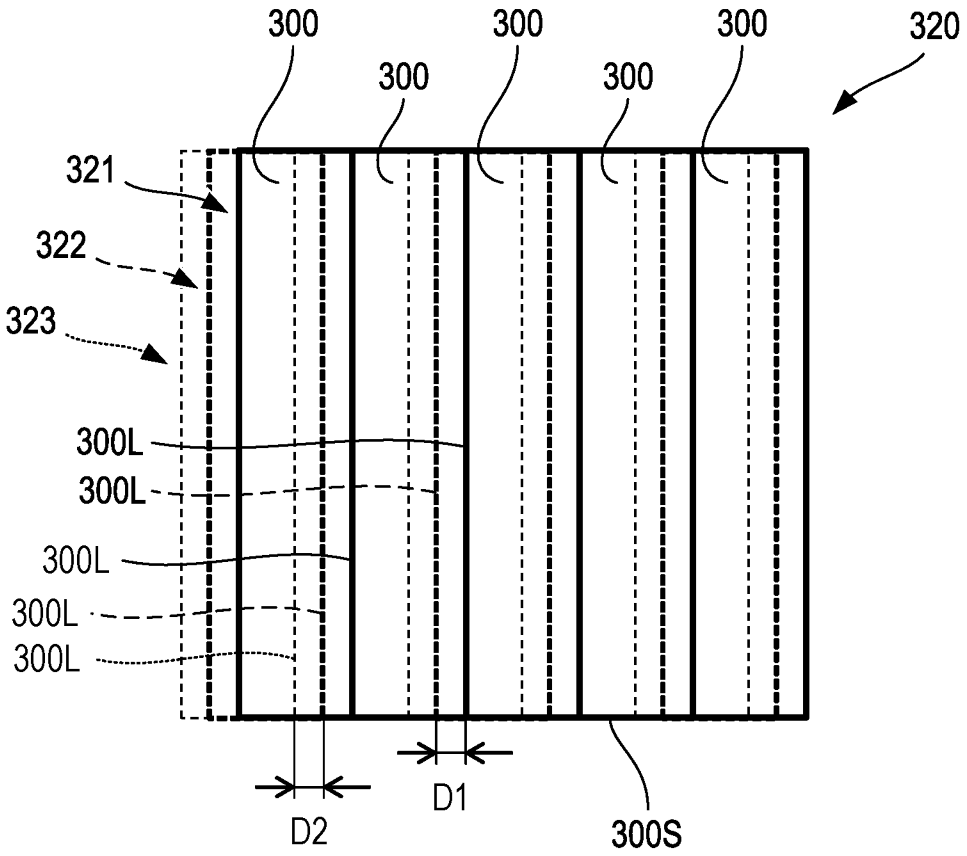
FIG. 3 is a plan view for explaining the structure of the multilayer magnetic sheet.

As illustrated in FIG. 3, the lower four layers (second layers 320) in FIG. 2 have a plurality of magnetic strips 300 each formed in a band shape with the short side 300S and the long side 300L. The plurality of magnetic strips 300 are aligned and arranged in a plate shape such that the long sides 300L are adjacent to each other.

The second layers 320 include a second-A layer 321, a second-B layer 322, and a second-C layer 323. The second-A layer 321 is one of the plurality of layers included in the second layers 320. The second-B layer 322 is one layer except for the second-A layer 321 among the plurality of layers included in the second layers 320. The second-C layer 323 is one layer except for the second-A layer 321 and the second-B layer 322 among the plurality of layers included in the second layers 320.

The order in which the second-A layer 321, the second-B layer 322, and the second-C layer 323 are stacked is not limited. In the present embodiment, a description will be given by applying the present disclosure to an example in which the second-A layer 321, the second-B layer 322, and the second-C layer 323 are stacked in this order from a side of the first layers 310.

The second-A layer 321, the second-B layer 322, and the second-C layer 323 may be adjacent layers or may be layers with another layer disposed therebetween. In the present embodiment, a description will be given by applying the present disclosure to an example in which the second-A layer 321, the second-B layer 322, and the second-C layer 323 are adjacent layers.

The position of the long side 300L of the magnetic strip 300 in the second-A layer 321 and the position of the long side 300L of the magnetic strip 300 in the second-B layer 322 are separated by 0.5 mm or more in the direction in which the short side 300S extends. The distance of the separation is indicated by D1.

The position of the long side 300L of the magnetic strip 300 in the second-C layer 323 is separated from the closer one of the position of the long side 300L of the magnetic strip 300 in the second-A layer 321 and the position of the long side 300L of the magnetic strip 300 in the second-B layer 322 by 0.5 mm or more in the direction in which the short side 300S extends. In the present embodiment, the position of the long side 300L of the magnetic strip 300 in the second-C layer 323 is separated from the position of the long side 300L in the second-B layer 322 by 0.5 mm or more in the direction in which the short side 300S extends. The distance of the separation is indicated by D2.

In the lower four layers (second layers 320) in FIG. 2, the positions of the long sides 300L are sequentially shifted in the direction in which the short side 300S extends. In other words, the positions of the long sides 300L are formed in a staircase shape (i.e., stepwise).

The second layers 320 may have a staircase shape as a whole, a structure in which the staircase shape is repeated, or a structure in which the staircase shape is alternately repeated for each layer.

In each of the first layers 310 and the second layers 320, it is preferable that two or more layers of the magnetic strips 300 be stacked, it is more preferable that four or more layers be stacked, and it is still more preferable that ten or more layers be stacked.

A ratio between the number of the stacked layers in the first layers 310 and the number of the stacked layers in the second layers 320 can be set as appropriate but is preferably between 2:8 and 8:2. The ratio is more preferably 3:7 to 7:3 and still more preferably 4:6 to 6:4.

The thickness direction is also referred to as "a direction in which the first layers 310 and the second layers 320 are stacked".

In the present embodiment, a description will be given by applying the present disclosure to an example in which one magnetic strip 300 is disposed in a direction in which the long side 300L extends. Note that the number of the magnetic strips 300 disposed in the direction in which the long side 300L extends may be more than one.

In the present embodiment, a description will be given by applying the present disclosure to an example in which a length L of the magnetic strip 300 in the direction in which the long side 300L extends is in the range of 100 mm or more and 1000 mm or less, and a width Wr of the magnetic strip 300 in the direction in which the short side 300S extends is in the range of 10 mm or more and 100 mm or less. Note that the length L of the magnetic strip 300 in the direction in which the long side 300L extends may be outside the range described above, and the width Wr of the magnetic strip 300 in the direction in which the short side 300S extends may be outside the range described above.

In the present embodiment, a description will be given by applying the present disclosure to an example in which a length L of the multilayer magnetic sheet 400 is in the range of 100 mm or more and 1000 mm or less, and a width Ws of the multilayer magnetic sheet 400 is in the range of 100 mm or more and 1000 mm or less.

Here, the length L is a dimension in a direction in which the long side 300L of the magnetic strip 300 in the first layers 310 constituting the multilayer magnetic sheet 400 extends, and the width Ws is a dimension in a direction in which the short side 300S of the magnetic strip 300 in the first layers 310 extends. Note that the length L of the multilayer magnetic sheet 400 may be outside the range described above, and the width Ws of the multilayer magnetic sheet 400 may be outside the range described above.

In the multilayer magnetic sheet 400 of the present disclosure, as in the second layers 320, the magnetic strips 300 are disposed such that the positions of the long sides 300L are shifted. Therefore, when the magnetic strips 300 having the same dimensions are used, end surfaces of the magnetic strips 300 are not aligned on an end surface side of the multilayer magnetic sheet 400. As thus described, the end surfaces of the magnetic strips 300 may not be aligned.

The magnetic strips 300 having different dimensions (dimensions in the width direction) may be used, and the end surfaces of the magnetic strips 300 may be aligned on the end surface side of the multilayer magnetic sheet 400. The end of the multilayer magnetic sheet 400 may be cut to adjust the dimensions.

Figure 4:
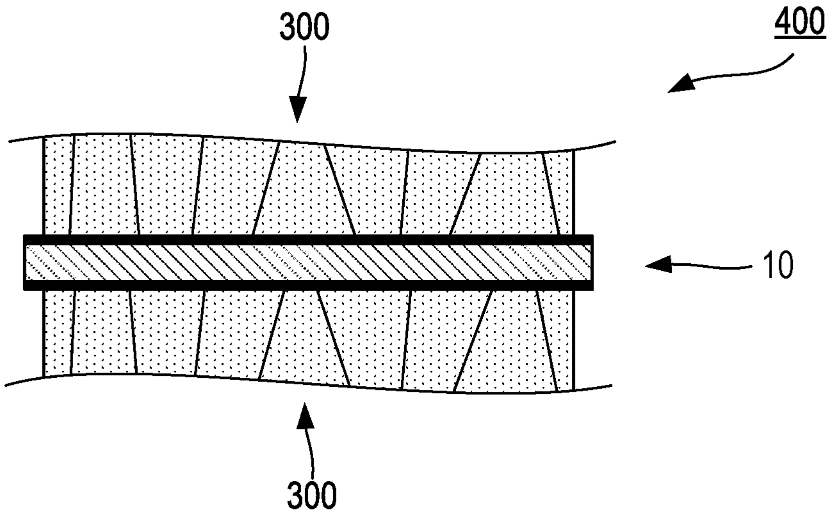
FIG. 4 is a partial cross-sectional view for explaining the structure of the multilayer magnetic sheet.

FIG. 4 is a partial cross-sectional view for explaining the structure of the multilayer magnetic sheet 400. As illustrated in FIG. 4, in a cross-sectional view, the multilayer magnetic sheet 400 may be configured with the magnetic strips 300 stacked through an adhesive layer 10 to be described later.

Figure 5:
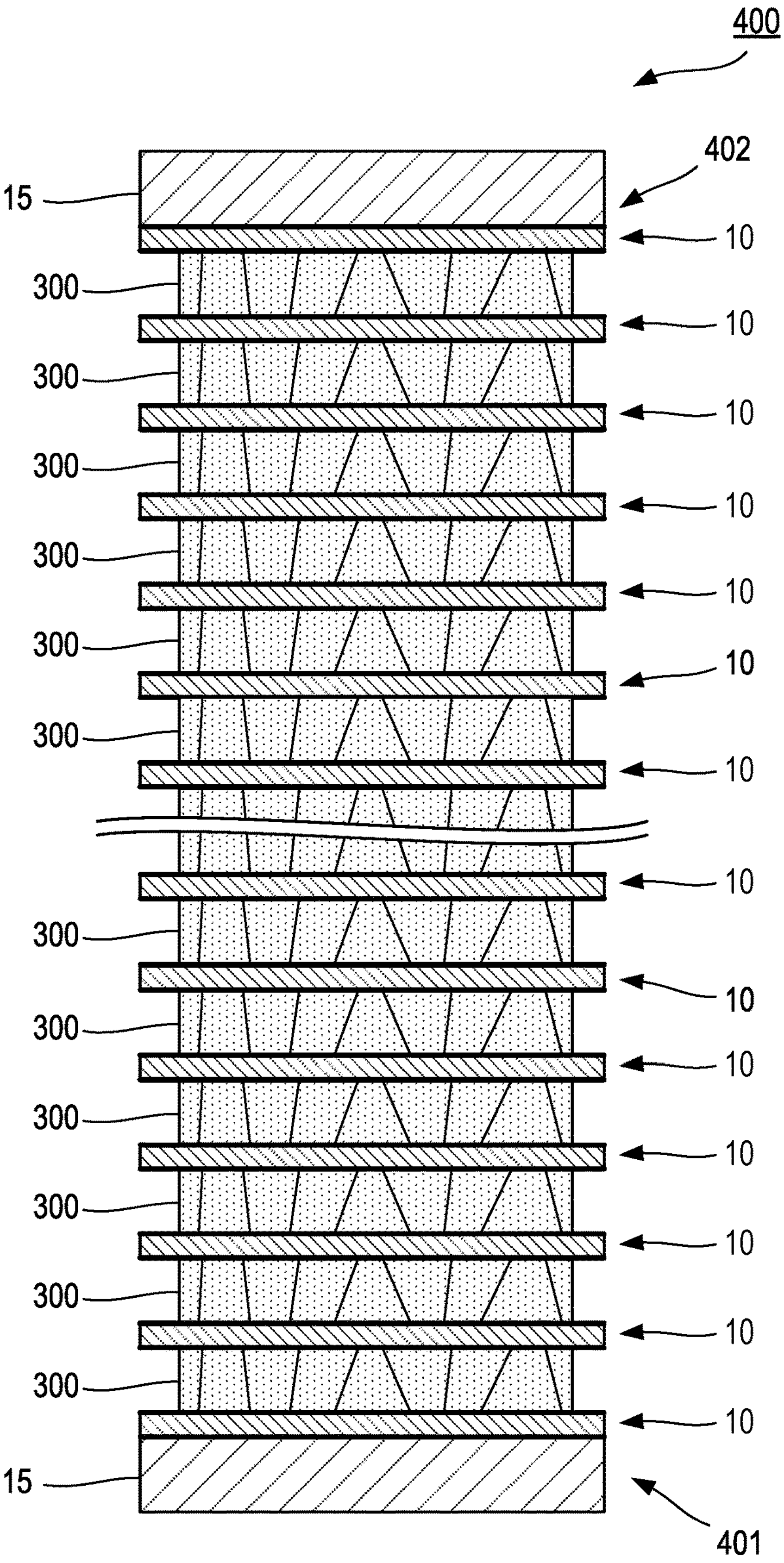
FIG. 5 is a cross-sectional view for explaining the structure of the multilayer magnetic sheet.

The multilayer magnetic sheet 400 illustrated in FIG. 5 is provided with resin sheets 15.

The resin sheet 15 may not be stacked on a first stacking end 401 or a second stacking end 402. The magnetic strip 300 may be exposed, or for example, an outer layer material selected from an amorphous alloy strip, a nanocrystalline alloy strip, another magnetic material, a metal foil such as aluminum, a resin sheet, or the like may be attached to the first stacking end 401 or the second stacking end 402.

The total number of the magnetic strips stacked in the thickness direction in the multilayer magnetic sheet 400 is ten or more, preferably 15 or more, more preferably 20 or more, and more preferably 25 or more. An upper limit of the number of the magnetic strips is not particularly set, and a required number of the magnetic strips may be stacked, and the upper limit is preferably 200 or less, for example.

As a material for forming the magnetic strip 300, an alloy with an alloy composition of an Fe-based or Co-based alloy can be used, and a nanocrystalline alloy or an amorphous alloy can be used. The magnetic strip 300 is particularly preferably a strip formed using a nanocrystal alloy as a material (hereinafter referred to also as a "nanocrystalline alloy strip").

As the nanocrystalline alloy strip, it is possible to use a nanocrystalline alloy strip obtained by subjecting an amorphous alloy strip capable of nanocrystallization to heat treatment for nanocrystallization. At the time of the heat treatment for nanocrystallization, it is preferable to perform the heat treatment for nanocrystallization in a state where tension is applied to the amorphous alloy strip capable of nanocrystallization. Note that a strip formed using an amorphous alloy as a material is also referred to as an "amorphous alloy strip" or a "non-crystalline alloy strip".

The nanocrystalline alloy strip preferably has a composition represented by a following general formula.

General Formula: $(Fe_{1-a}M_a)_{100-x-y-z-\alpha-\beta-\gamma}Cu_xSi_yB_zM'_\alpha M''_\beta X_\gamma$ (atomic percent)

In the above general formula, M is Co and/or Ni, M' is at least one element selected from the group consisting of Nb, Mo, Ta, Ti, Zr, Hf, V, Cr, Mn, and W, M" is at least one element selected from the group consisting of Al, a platinum group element, Sc, a rare earth element, Zn, Sn, and Re, X is at least one element selected from the group consisting of C, Ge, P, Ga, Sb, In, Be, and As, and a, x, y, z, α, β, and γ satisfy $0 \le a \le 0.5$, $0.1 \le x \le 3$, $0 \le y \le 30$, $0 \le z \le 25$, $5 \le y+z \le 30$, $0 \le \alpha \le 20$, $0 \le \beta \le 20$, and $0 \le \gamma \le 20$, respectively.

Preferably, in the general formula, a, x, y, z, α, β, and γ satisfy $0 \leq a \leq 0.1$, $0.7 \leq x \leq 1.3$, $12 \leq y \leq 17$, $5 \leq z \leq 10$, $1.5 \leq \alpha \leq 5$, $0 \leq \beta \leq 1$, and $0 \leq \gamma \leq 1$, respectively.

In the present embodiment, a description will be given by applying the present disclosure to an example in which the magnetic strip 300 is a strip (FT-3 manufactured by Hitachi Metals, Ltd. (now, Proterial, Ltd.)) of a Fe-Cu-Nb-Si-B based nanocrystal alloy. Note that the magnetic strip 300 may be a nanocrystalline alloy strip having another composition represented by the above general formula or may be an amorphous alloy strip.

When the magnetic strip 300 is a nanocrystalline alloy strip, the magnetic strip 300 is mechanically more brittle than when the magnetic strip is an amorphous alloy strip. When the magnetic strip 300 is a nanocrystalline alloy strip, cracks 21 can be formed with a small external force when directly applying an external force to the magnetic strip 300 to form the cracks 21.

When the magnetic strip 300 is a nanocrystalline alloy strip, the cracks 21 can be formed without substantially forming unevenness on the surface of the magnetic strip 300. Thus, a planar state of the magnetic strip 300 can be made favorable. Temporal change of the shape of the magnetic strip 300, generated after the magnetic strip 300 and the adhesive layer 10 are bonded to each other to form a magnetic sheet 100, is reduced. As a result, it is possible to reduce temporal change of the magnetic characteristics in the magnetic strip 300.

As the magnetic strip 300, for example, it is possible to use an alloy strip, which is manufactured by roll rapid cooling and which has a thickness of 100 μm or less. The thickness of the magnetic strip 300 is preferably 50 μm or less, more preferably 30 μm or less, particularly preferably 25 μm or less, particularly preferably 20 μm or less. It is difficult to handle the magnetic strip 300 when the thickness is thin, and hence the thickness of the magnetic strip 300 is preferably 5 μm or more, and more preferably 10 μm or more.

In the multilayer magnetic sheet 400, the magnetic strips 300 are stacked and bonded to each other.

In the multilayer magnetic sheet of the present disclosure, it is preferable to use, as the magnetic strip 300, a magnetic sheet 100 in which an adhesive layer is formed on one surface of the magnetic strip 300. The magnetic sheet 100 comprises the adhesive layer 10 to be described later and can be bonded to another magnetic strip 300, whereby the magnetic strips 300 can be easily stacked and bonded.

Figure 6:
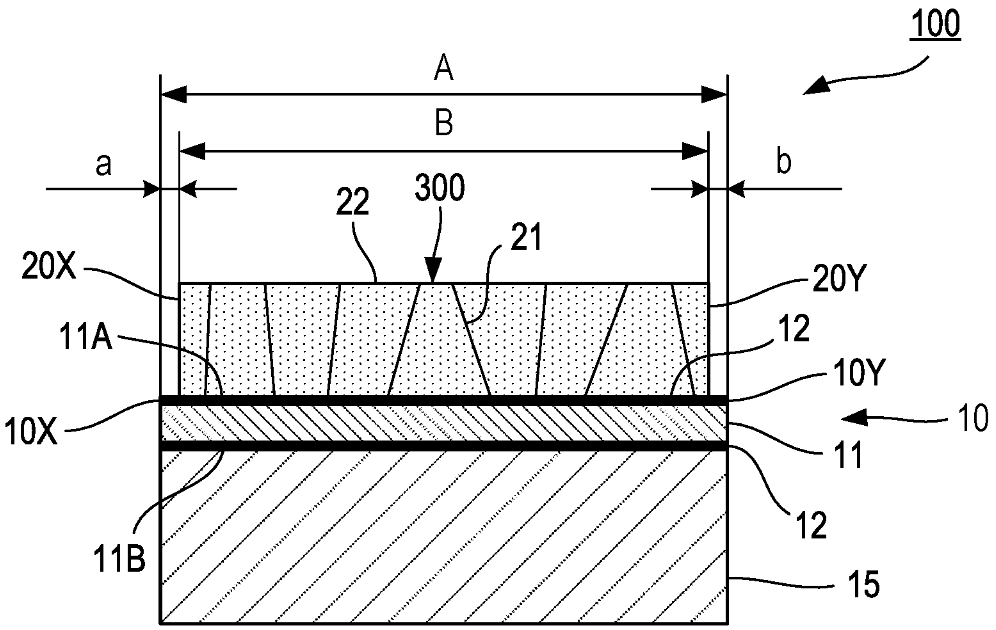
FIG. 6 is a cross-sectional view for explaining a structure of a magnetic sheet.

FIG. 6 is a cross-sectional view taken along a width direction for explaining a structure of the magnetic sheet 100.

The magnetic sheet 100 can be used as the magnetic strip 300 in the structure described above. As illustrated in FIG. 6, the magnetic sheet 100 has a configuration in which one adhesive layer 10, one resin sheet 15, and one magnetic strip 300 are stacked. When the magnetic strips 300 are stacked, the resin sheet 15 may be peeled off from the magnetic sheet 100, and another magnetic strip 300 may be bonded to the adhesive layer 10.

The adhesive layer 10 is a member to which the magnetic strip 300 is attached. The adhesive layer 10 is a member formed in an elongated shape, for example, a film-like member formed in a rectangular shape. The adhesive layer 10 comprises a support 11 and an adhesive 12 as main components.

The support 11 is a band-shaped film member formed in an elongated shape, for example, a film member formed in a rectangular shape. The support 11 is formed using a flexible resin material. As the resin material, polyethylene-terephthalate (PET) can be used.

The adhesive 12 is provided in a film shape or a layer shape on each of a first surface 11A and a second surface 11B of the support 11.

As the adhesive 12, for example, a pressure sensitive adhesive can be used. For example, a known adhesive such as an acrylic adhesive, a silicone-based adhesive, a urethane-based adhesive, a synthetic rubber, or a natural rubber can be used as the adhesive 12. The acrylic adhesive is preferable as the adhesive 12 because acrylic adhesive is excellent in heat resistance and moisture resistance and has a wide range of materials that can be bonded.

The adhesive 12 is provided in a layer shape on each of the first surface 11A and the second surface 11B of the support 11. In the present embodiment, a description will be given by applying the present disclosure to an example in which the adhesive 12 is provided on each of the entire surfaces of the first surface 11A and the second surface 11B of the support 11.

The magnetic strip 300 is a strip formed in an elongated band shape using a magnetic material. Cracks 21 are formed in the magnetic strip 300. The magnetic strip 300 is divided into a plurality of small pieces 22 by the cracks 21. In other words, the magnetic strip 300 comprises a plurality of small pieces 22. The crack 21 refers to a magnetic gap formed in the magnetic strip 300 and includes, for example, a break and/or a fissure of the magnetic strip 300.

By forming the cracks 21 in the magnetic strip 300, the Q factor can be easily improved when the multilayer magnetic sheet 400 is used as a magnetic material for an inductor. When the multilayer magnetic sheet 400 is used as a magnetic body for magnetic shielding, an eddy current loss can be easily reduced by dividing a current path of the magnetic strip 300.

The magnetic strip 300 is bonded to the adhesive 12 of the adhesive layer 10. In the present embodiment, the magnetic strip 300 is bonded to the adhesive 12 provided on the first surface 11A of the adhesive layer 10. The magnetic strip 300 and the adhesive layer 10 preferably have shapes that satisfy a relationship of a following formula.

$$0.2\ \text{mm} \leq (\text{width A} - \text{width B}) \leq 3\ \text{mm}$$

The width A is a dimension related to the adhesive layer 10, and more preferably a dimension related to a region provided with the adhesive 12 to which the magnetic strip 300 is bonded in the adhesive layer 10. The width B is a dimension related to the magnetic strip 300. When the adhesive 12 is provided on the entire surface of the support 11 of the adhesive layer 10, the width A is a dimension related to the adhesive layer 10 or the support 11.

Here, a lower limit of (width A−width B) is preferably 0.5 mm, and more preferably 1.0 mm. An upper limit of (width A−width B) is preferably 2.5 mm and more preferably 2.0 mm.

The magnetic strip 300 and the adhesive layer 10 are preferably disposed to satisfy a relationship of another following formula.

$$0\ \text{mm} < \text{gap a, and } 0\ \text{mm} < \text{gap b}$$

In the magnetic sheet 100 of the present disclosure, the width A of the adhesive layer 10 provided with the adhesive 12 in the adhesive layer 10 is larger than the width B of the magnetic strip 300. When attaching the magnetic strip 300 to the adhesive layer 10, even if meandering occurs in the adhesive layer 10 or the magnetic strip 300, the adhesive 12 of the adhesive layer 10 can be easily disposed on the entire surface of the magnetic strip 300.

By setting the value obtained by subtracting the width B from the width A to 0.2 mm or more, it is easy to prevent occurrence of a portion where the adhesive 12 is not disposed on the magnetic strip 300 when attaching the magnetic strip 300 to the adhesive layer 10. By setting the value obtained by subtracting the width B from the width A to 3 mm or less, it is easy to prevent the interval between the magnetic strips 300 from increasing when disposing the magnetic strips 300 in the magnetic sheet 100. As a result, when the magnetic sheets 100 are aligned in parallel, it is easy to prevent the interval (magnetic gap) between the magnetic strips 300 from increasing.

The gap a and the gap b are distances from the ends of the adhesive layer 10 to the ends of the magnetic strip 300. Specifically, the gap a is a distance from a first adhesive layer end 10X of the adhesive layer 10 to a first strip end 20X of the magnetic strip 300. The gap b is a distance from a second adhesive layer end 10Y of the adhesive layer 10 to a second strip end 20Y of the magnetic strip 300.

The first strip end 20X is an end of the magnetic strip 300 on the same side as the first adhesive layer end 10X. The second adhesive layer end 10Y is an end of the adhesive layer 10 opposite to the first adhesive layer end 10X. The second strip end 20Y is an end of the magnetic strip 300 on the same side as the second adhesive layer end 10Y.

The width A, the width B, the gap a, and the gap b are dimensions in a direction intersecting, or more preferably orthogonal to, the longitudinal direction of the magnetic strip 300. The longitudinal direction of the magnetic strip 300 and the longitudinal direction of the adhesive layer 10 are the same direction.

In the present embodiment, a method for manufacturing the magnetic sheet 100 applied to the present embodiment will be described below by applying the present disclosure to an example in which the length of the magnetic strip 300 in the longitudinal direction is 20,000 m. Further, a description will be given by applying the present disclosure to an example in which the width A, which is a dimension related to the adhesive layer 10 or the support 11, is 32 mm, the width B, which is a dimension related to the magnetic strip 300, is 30 mm, and the width A−the width B is 2 mm.

The resin sheet 15 is a film-like member formed using a resin and is also referred to as a “protective film”, a “release film”, or a “liner”. The resin sheet 15 is a member used for protecting the magnetic strip 300 and the multilayer magnetic sheet 400.

The resin sheet 15 has a function of preventing an unnecessary increase in the cracks 21 to be described later (or cracks connecting a plurality of cracks 21 in a mesh shape) due to application of an unintended external force to the magnetic strip 300. Further, the resin sheet 15 has a function of preventing the small pieces 22 of the magnetic strip 300 from falling off and a function of preventing the magnetic strip 300 from rusting.

Moreover, the resin sheet 15 has a function of preventing unnecessary deformation when the multilayer magnetic sheet 400 is processed into a predetermined shape. Examples of the unnecessary deformation include surface unevenness. The resin sheet 15 may be stacked together with the adhesive layer 10 as described above or may be stacked alone.

The resin sheet 15 is preferably a film-like member formed using a resin, and more preferably a member formed using a resin with elasticity. When the resin sheet 15 is a member formed using a resin, generation of unevenness on the surface of the magnetic strip 300 can be easily prevented by an elastic force of the resin sheet 15.

Even when unevenness is generated on the surface of the magnetic strip 300, the unevenness of the magnetic strip 300 tends to be flat due to the elastic force of the resin sheet 15. As a result, a planar state of the magnetic strip 300 can be set to a favorable state with less unevenness. As a result, it is easy to reduce temporal change of the magnetic characteristics in the multilayer magnetic sheet 400.

As the resin sheet 15, a resin having a lower limit of a tensile elastic modulus of 0.1 GPa can be used. When the tensile elastic modulus of the resin is 0.1 GPa or more, the above effect can be easily obtained sufficiently. The lower limit of the tensile elastic modulus is preferably 0.5 GPa, and more preferably 1.0 GPa.

An upper limit of the tensile elastic modulus of the resin is preferably 10 GPa. When the upper limit exceeds 10 GPa, the deformation of the alloy strip may be suppressed when the cracks 21 to be described later are formed. The upper limit of the tensile elastic modulus is preferably 9 GPa, and more preferably 8 GPa.

In the resin sheet 15, the thickness of the resin sheet 15 is preferably 1 μm or more and 100 μm or less. When the thickness of the resin sheet 15 increases, the multilayer magnetic sheet 400 is less likely to be deformed. As a result, it may be difficult to dispose the multilayer magnetic sheet 400 along a curved surface or a bent surface.

When the thickness of the resin sheet 15 is less than 1 μm, the resin sheet 15 is more likely to be deformed. As a result, handling of the resin sheet 15 becomes difficult, and the function of the resin sheet 15 for supporting the magnetic strip 300 may not be obtained sufficiently. When the resin sheet 15 is a protective film, the strength of the resin sheet 15 becomes weak, and the function of protecting the magnetic strip 300 and the like may not be sufficient.

As the resin of the resin sheet 15, it is possible to use, for example, polyethylene terephthalate (PET), polyimide, polyetherimide, polyethylene naphthalate, polypropylene, polyethylene, polystyrene, polycarbonate, polysulfone, polyetherketone, polyvinyl chloride, polyvinyl alcohol, a fluororesin, an acrylic resin, cellulose, or the like. Polyamide and polyimide are particularly preferable as the resin for forming the resin sheet 15 from the viewpoint of heat resistance and dielectric loss.

Figure 7:
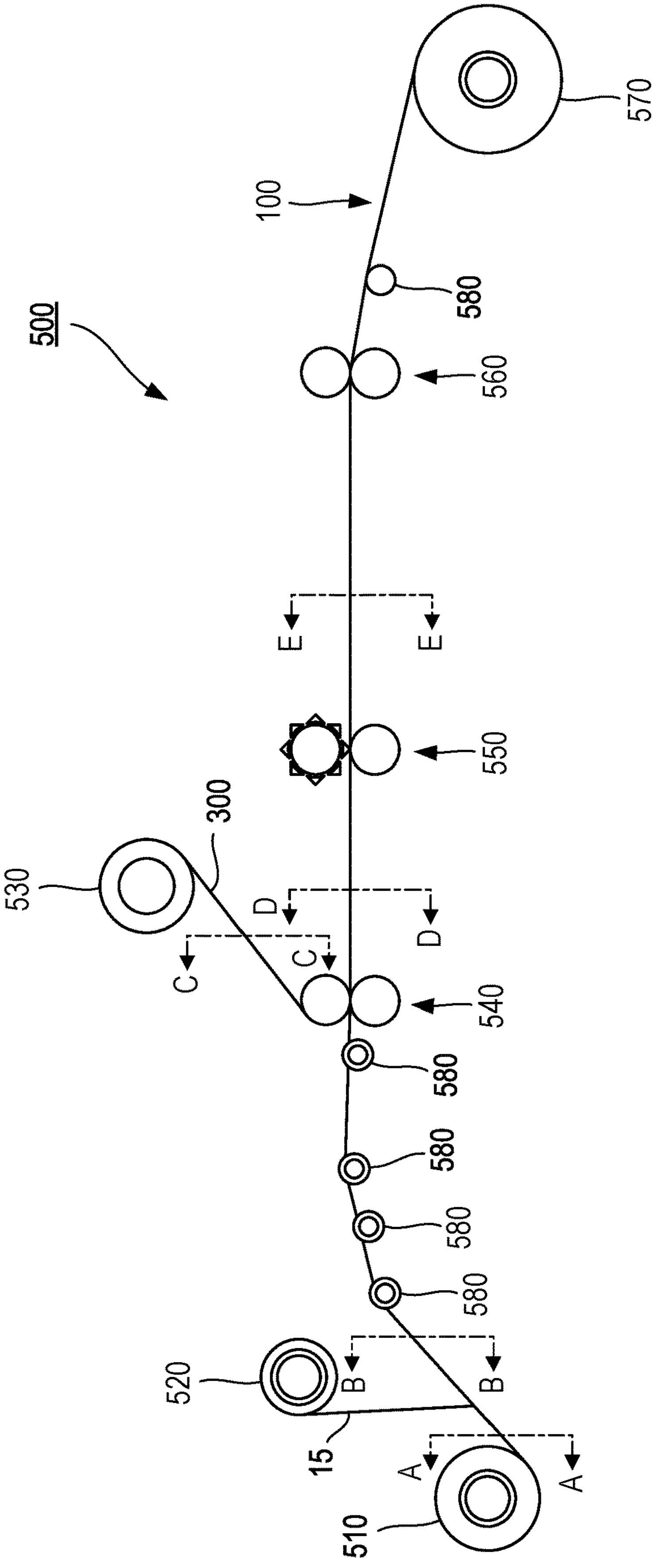
FIG. 7 is a schematic view for explaining a method for manufacturing the magnetic sheet.

FIG. 7 is a schematic view for explaining a method for manufacturing the magnetic sheet 100. The magnetic sheet 100 can be used as the magnetic strip 300 of the multilayer magnetic sheet 400 described with reference to FIGS. 1 to 5. The magnetic sheet 100 is manufactured using a manufacturing apparatus 500 illustrated in FIG. 7. The manufacturing apparatus 500 comprises a first unwinding roll 510, a first winding roll 520, a second unwinding roll 530, attaching rolls 540, crack rolls 550, flattening rolls 560, and a third winding roll 570 as main components from an upstream side to a downstream side in the manufacturing process. The manufacturing apparatus 500 may further comprise a plurality of guide rolls 580. Note that the guide roll 580 can be disposed as necessary even at a position not illustrated.

Figure 8:
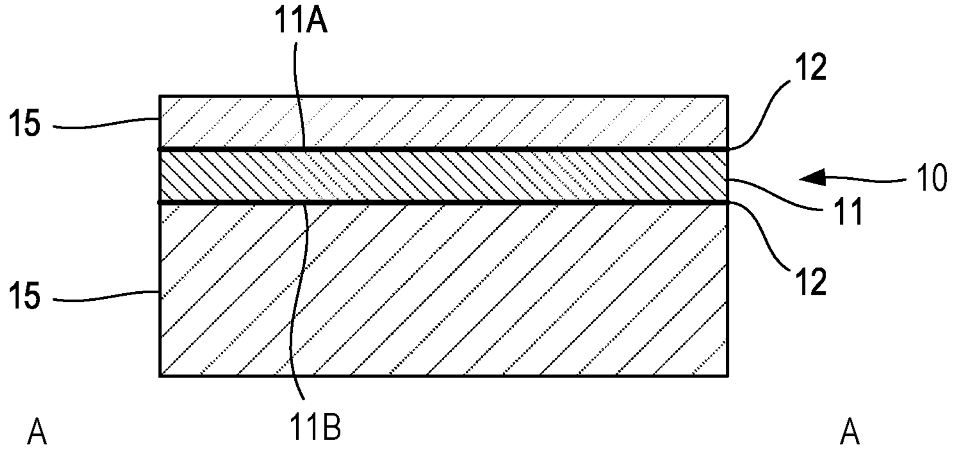
FIG. 8 is a cross-sectional view for explaining a configuration of a laminate supplied from a first unwinding roll.

FIG. 8 is a cross-sectional view for explaining a configuration of a laminate supplied from the first unwinding roll 510.

As illustrated in FIG. 8, a laminate in which the resin sheet 15 is stacked on each of the first surface 11A and the second surface 11B of the adhesive layer 10 is wound around the first unwinding roll 510. The resin sheet 15 disposed on the first surface 11A is a protective sheet, and the resin sheet 15 disposed on the second surface 11B is also referred to as a "liner". The resin sheet 15 disposed on the first surface 11A is a sheet thinner than the resin sheet 15 disposed on the second surface 11B.

Figure 9:
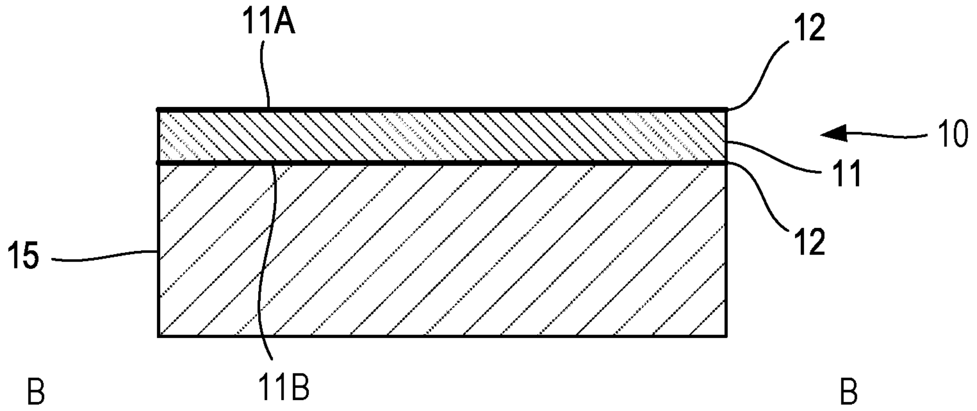
FIG. 9 is a cross-sectional view for explaining a configuration of a laminate supplied from the first unwinding roll, with a resin sheet peeled off.

FIG. 9 is a cross-sectional view for explaining a configuration of the laminate, which is supplied from the first unwinding roll 510 and from which the resin sheet 15 has been peeled off.

As illustrated in FIG. 9, the resin sheet 15 disposed on the first surface 11A is peeled off from the laminate unwound from the first unwinding roll 510. As illustrated in FIG. 7, the peeled resin sheet 15 is wound around the first winding roll 520.

Figure 10:
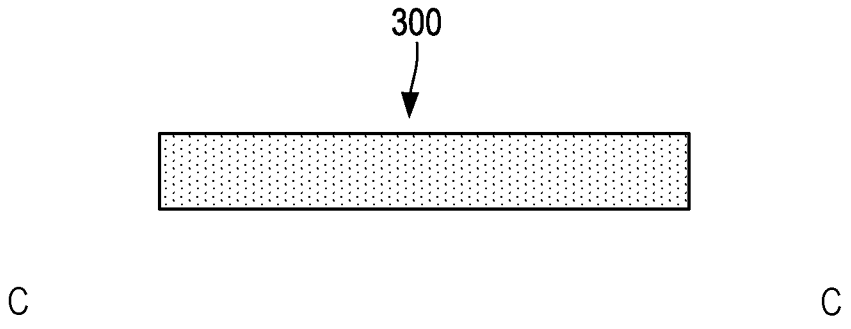
FIG. 10 is a cross-sectional view for explaining a configuration of a magnetic strip supplied from a second unwinding roll.

FIG. 10 is a cross-sectional view for explaining a configuration of the magnetic strip 300 supplied from the second unwinding roll 530.

The laminate from which the resin sheet 15 disposed on the first surface 11A has been peeled off is guided to the attaching rolls 540 by the plurality of guide rolls 580. The magnetic strip 300 unwound from the second unwinding roll 530 has further been guided to the attaching rolls 540. As illustrated in FIG. 10, there is no crack 21 formed in the magnetic strip 300 guided to the attaching rolls 540.

Here, a method for manufacturing the magnetic strip 300 unwound from the second unwinding roll 530 will be described. For example, a case where the magnetic strip 300 is a nanocrystalline alloy will be described. The magnetic strip 300 is manufactured by a manufacturing method comprising: a step of rapidly cooling a molten alloy to obtain an amorphous alloy strip capable of nanocrystallization; and a heat treatment step of heat-treating the amorphous alloy strip at a temperature equal to or higher than a crystallization onset temperature to form fine crystal grains.

The rapid cooling described above is performed by a single roll method in which a molten metal is discharged onto a rotating cooling roll and rapidly cooled and solidified. The magnetic strip 300 has an elongated shape in which a direction along a rotation direction of the cooling roll is a longitudinal direction. The length of the magnetic strip 300 in the longitudinal direction may be, for example, 20,000 m.

The temperature of the heat treatment varies depending on the alloy composition, but is generally 450° C. or higher. The fine crystal grains are, for example, Fe having a body-centered cubic lattice structure with solid solution of Si or the like. Analysis of the fine crystal grains can be performed using X-ray diffraction and a transmission electron microscope.

In the nanocrystalline alloy, at least 50 vol % of the nanocrystalline alloy is occupied by fine crystal grains having an average grain size of 100 nm or less, measured in the largest dimension. A portion except for the fine crystal grains in the nanocrystalline alloy is mainly amorphous. A proportion of the fine crystal grains may be substantially 100 vol %.

Figure 11:
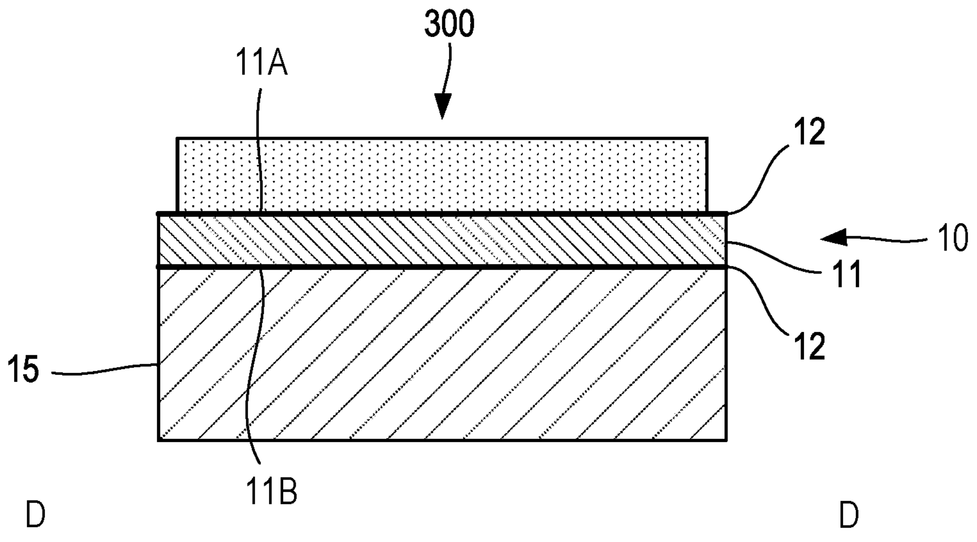
FIG. 11 is a cross-sectional view for explaining a state in which the magnetic strip has been bonded to an adhesive layer by attaching rolls.

FIG. 11 is a cross-sectional view for explaining a state in which the magnetic strip 300 has been bonded to the adhesive layer 10 by the attaching rolls 540.

As illustrated in FIG. 7, the attaching rolls 540 press and bond the magnetic strip 300 to the laminate from which the resin sheet 15 has been peeled off. Specifically, the laminate and the magnetic strip 300 are guided between two rolls disposed to face each other, and the magnetic strip 300 is pressed against and bonded to the first surface 11A of the adhesive layer 10 using the two rolls as illustrated in FIG. 11.

The magnetic strip 300 may be disposed such that its center coincides with the center of the adhesive layer 10 in the width direction, or may be disposed such that its center is away from the center of the adhesive layer 10. In this case, the placement is made to satisfy the relationship of 0 mm<gap a, and 0 mm<gap b (cf. FIG. 6). As illustrated in FIG. 7, the laminate to which the magnetic strip 300 is bonded is guided from the attaching rolls 540 to the crack rolls 550.

Figure 12:
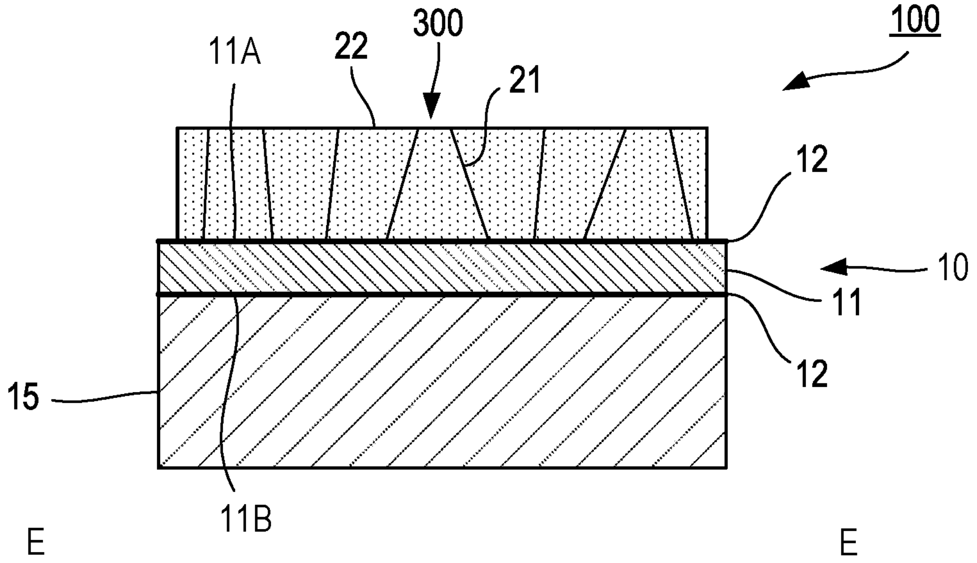
FIG. 12 is a cross-sectional view for explaining a state in which cracks have been formed in the magnetic strip by crack rolls.

FIG. 12 is a cross-sectional view for explaining a state in which the cracks 21 have been formed in the magnetic strip 300 by the crack rolls 550.

The crack rolls 550 form the cracks 21 in the magnetic strip 300 bonded to the adhesive layer 10. Specifically, a laminate to which the magnetic strip 300 is bonded is guided between two rolls disposed to face each other, and a roll provided with protrusions among the two rolls is pressed against the magnetic strip 300 to form the cracks 21 as illustrated in FIG. 12.

Among the two rolls, the roll provided with no protrusion is disposed on a side of the laminate from which the resin sheet 15 has been peeled off. The magnetic strip 300 in which the cracks 21 are formed comprises a plurality of small pieces 22. The plurality of small pieces 22 are bonded to the adhesive layer 10.

Here, a configuration of the crack rolls 550 will be described. The crack rolls 550 comprise a roll in which a plurality of convex members are arranged on a peripheral surface. A tip of an end of each the convex members of the crack rolls 550 may be flat, conical, inverted conical with a recessed center, or cylindrical. The plurality of convex members may be arranged regularly or irregularly.

The long magnetic strip 300 is pressed against the crack rolls 550 or the long magnetic strip 300 is caused to pass between the two crack rolls 550 to continuously form the cracks 21 in the magnetic strip 300. Further, the convex members of the crack rolls 550 are pressed against a plurality of places on the surface of the magnetic strip 300 to form a plurality of cracks 21 in the magnetic strip 300.

In the formation of the cracks using the crack rolls 550, it is preferable to further form cracks connecting the plurality of cracks 21 in a mesh shape. Specifically, it is preferable to include a step of pressing the crack rolls 550 against the magnetic strip 300 to form a plurality of cracks 21 and then forming cracks connecting the plurality of cracks 21 in a mesh shape.

For example, after an external force is directly applied to the magnetic strip 300 by using the crack rolls 550 to form the cracks 21, a second external force may be applied by means such as bending or winding the magnetic strip 300 to form cracks connecting the plurality of cracks 21 in a mesh shape. Cracks connecting the cracks 21 (magnetic gaps connecting the cracks) are formed using the cracks 21 as starting points of brittle fracture and/or crack fracture.

In the step of forming the cracks connecting the plurality of cracks 21 in a mesh shape, the second external force as described above may not be applied. When the second external force is not applied, cracks connecting the plurality of cracks 21 in a mesh shape are formed in the process of forming the plurality of cracks 21.

The laminate guided from the crack rolls 550 to the flattening rolls 560 is subjected to flattening treatment by the flattening rolls 560. Note that the flattening rolls 560 are also referred to as shaping rolls.

Specifically, the laminate is guided between two rolls disposed opposite to each other in the flattening rolls 560, and the laminate is sandwiched and pressed by the two rolls. As a result, the surface of the magnetic strip 300 in which the cracks 21 are formed is flattened.

The laminate subjected to the flattening treatment becomes the magnetic sheet 100. The magnetic sheet 100 is guided to the third winding roll 570 via the guide roll 580. The magnetic sheet 100 is wound around the third winding roll 570.

In addition to the method of winding by the third winding roll 570, the magnetic sheet 100 may be cut to a desired length.

The magnetic sheet 100 wound by the third winding roll 570 can be used as the magnetic strip 300 illustrated in FIGS. 1 to 5. At this time, the magnetic sheet 100 can be cut to a desired length and used. Of course, the method of cutting may be used without winding.

By using the magnetic sheet 100 as the magnetic strip 300 illustrated in FIGS. 1 to 5, the magnetic strips 300 (magnetic sheets 100) to be stacked can be easily bonded to each other. It is easier to handle the magnetic strip 300 as the magnetic sheet 100 than to handle the magnetic strip 300 alone. When a nanocrystalline alloy strip is used as the magnetic strip 300, the nanocrystalline alloy strip has a brittle property, and it is not easy to handle the nanocrystalline alloy strip alone.

When the magnetic sheet of the present disclosure is used as the magnetic strip 300 in FIGS. 1 to 5, the magnetic gap between the magnetic strips 300 tends to be large because a resin layer wider than the magnetic strip 300 is used. However, the present disclosure has a configuration capable of preventing deterioration of characteristics due to the magnetic gap between the magnetic strips 300. Therefore, even when the magnetic sheet is used as the magnetic strip in FIGS. 1 to 5, a multilayer magnetic sheet with a high magnetic permeability and a high Q factor can be configured.

With the multilayer magnetic sheet 400 having the above configuration, the overlapping of the positions of the magnetic gaps when viewed in the stacking direction of the magnetic strips 300 can be prevented, thus making it easier to prevent deterioration of the magnetic characteristics in the multilayer magnetic sheet 400. As a result, a multilayer magnetic sheet with a high magnetic permeability and a high Q factor can be obtained.

By setting the width of the multilayer magnetic sheet 400 to 100 mm or more and 1000 mm or less and setting the length of the multilayer magnetic sheet 400 to 100 mm or more and 1000 mm or less, the multilayer magnetic sheet 400 can be formed in a desired size.

By making the magnetic strip 300 an amorphous alloy strip or a nanocrystalline alloy strip, the magnetic strip 300 can be made a soft magnetic strip. Also, the magnetic strip 300 can be formed using an alloy.

By including the plurality of small pieces 22 in the magnetic strip 300, the characteristics of the multilayer magnetic sheet 400 can be easily improved. Specifically, when the multilayer magnetic sheet 400 is used as a magnetic body for an inductor, the Q factor can be easily improved. When the multilayer magnetic sheet 400 is used as a magnetic body for magnetic shielding, the eddy current loss can be easily reduced by dividing the current path of the magnetic strip 300.

By providing the adhesive layer 10 on one surface of the magnetic strip 300, the adjacent magnetic strips 300 can be held by the adhesive layer 10. Specifically, the adhesive 12 provided on the first surface 11A of the support 11 is bonded to one of the adjacent magnetic strips 300, and the adhesive 12 provided on the second surface 11B is bonded to the other of the adjacent magnetic strips 300.

By providing the resin sheet 15 at the first stacking end 401 or the second stacking end 402, the manufactured multilayer magnetic sheet 400 can be easily protected. For example, when conveying the manufactured multilayer magnetic sheet 400, it is easy to prevent damage to the adhesive layer 10 and the magnetic strip 300.

An outer layer material selected from an amorphous alloy strip, a nanocrystalline alloy strip, another magnetic material, a metal foil such as aluminum, a resin sheet, or the like may be attached to the first stacking end 401 or the second stacking end 402.

The width A of the region of the adhesive layer 10 where the adhesive 12 is provided is larger than the width B of the magnetic strip 300. Thus, even if meandering occurs in the adhesive layer 10 or the magnetic strip 300 when attaching the magnetic strip 300 to the adhesive layer 10, the adhesive 12 of the adhesive layer 10 can be easily disposed on the entire surface of the magnetic strip 300.

By setting the value obtained by subtracting the width B from the width A to 0.2 mm or more, occurrence of a portion where the adhesive 12 is not disposed on the magnetic strip 300 can be prevented easily when attaching the magnetic strip 300 to the adhesive layer 10. By setting the value obtained by subtracting the width B from the width A to 3 mm or less, increase of the portion of the magnetic sheet 100 where the magnetic strip 300 is not disposed can be prevented easily.

Note that the technical scope of the present disclosure is not limited to the above embodiment, and various modifications can be made without departing from the gist of the present disclosure. For example, the multilayer magnetic sheet 400 according to the present disclosure can be used as an inductive element or the like.

What is claimed is:

1. A multilayer magnetic sheet comprising ten or more layers of magnetic strips each formed in a band shape with a short side and a long side, wherein the magnetic strips are aligned and arranged in a plate shape in each of the layers such that the long sides of the magnetic strips are adjacent to each other, the layers comprise first layers, in each of which the long sides of the magnetic strips adjacent to each other overlap in the same layer, and second layers, in each of which the long sides of the magnetic strips adjacent to each other do not overlap, the first layers comprise at least two stacked layers, and a position of the long side in one layer included in the second layers is separated from a position of the long side in another layer included in the second layers by 0.5 mm or more in a direction in which the short side extends.

2. The multilayer magnetic sheet according to claim 1, wherein a position of the long side in still another layer included in the second layers is separated from the positions of the long sides in the one layer included in the second layers and the another layer included in the second layers by 0.5 mm or more in the direction in which the short side extends.

3. The multilayer magnetic sheet according to claim 1, wherein the multilayer magnetic sheet has a width of 100 mm or more and 1000 mm or less and a length of 100 mm or more and 1000 mm or less.

4. The multilayer magnetic sheet according to claim 1, wherein the magnetic strips comprise an amorphous alloy strip or a nanocrystalline alloy strip.

5. The multilayer magnetic sheet according to claim 1, wherein at least one of the magnetic strips comprise a nanocrystalline alloy strip and comprises pieces.

6. The multilayer magnetic sheet according to claim 1, further comprising an adhesive layer provided on one surface of each of the magnetic strips, wherein the adhesive layer comprises a support formed in a band shape and an adhesive provided on each of a first surface and a second surface of the support.

7. The multilayer magnetic sheet according to claim 6, wherein a width A that is a dimension of the adhesive layer in a direction intersecting a longitudinal direction of the adhesive layer and a width B that is a dimension of each of the magnetic strips in a direction intersecting a longitudinal direction of the magnetic, satisfy a relationship of 0.2 mm≤(width A-width B)≤3 mm.

8. The multilayer magnetic sheet according to claim 1, further comprising:

an adhesive layer comprising a support formed in a band shape and an adhesive provided on each of a first surface and a second surface of the support; and a resin sheet that is a film-shaped member formed using a resin and that is bonded to the adhesive layer, wherein the adhesive layer and the resin sheet are provided on the magnetic strip at a first stacking end or on the magnetic strip at a second stacking end opposite to the first stacking end in a direction in which the magnetic strips are stacked.

9. The multilayer magnetic sheet according to claim 2, wherein the multilayer magnetic sheet has a width of 100 mm or more and 1000 mm or less and a length of 100 mm or more and 1000 mm or less.

10. The multilayer magnetic sheet according to claim 2, wherein the magnetic strips comprise an amorphous alloy strip or a nanocrystalline alloy strip.

11. The multilayer magnetic sheet according to claim 2, wherein at least one of the magnetic strips comprise a nanocrystalline alloy strip and comprises pieces.

12. The multilayer magnetic sheet according to claim 2, further comprising an adhesive layer provided on one surface of each of the magnetic strips, wherein the adhesive layer comprises a support formed in a band shape and an adhesive provided on each of a first surface and a second surface of the support.

13. The multilayer magnetic sheet according to claim 12, wherein a width A that is a dimension of the adhesive layer in a direction intersecting a longitudinal direction of the adhesive layer and a width B that is a dimension of each of the magnetic strips in a direction intersecting a longitudinal direction of each of the magnetic strips satisfy a relationship of 0.2 mm ≤(width A-width B)≤3 mm.

14. The multilayer magnetic sheet according to claim 2, further comprising:

an adhesive layer comprising a support formed in a band shape and an adhesive provided on each of a first surface and a second surface of the support; and a resin sheet that is a film-shaped member formed using a resin and that is bonded to the adhesive layer, wherein the adhesive layer and the resin sheet are provided on the magnetic strip at a first stacking end or on the magnetic strip at a second stacking end opposite to the first stacking end in a direction in which the magnetic strips are stacked.

* * * * *